US008932670B2

(12) United States Patent
Botelho et al.

(10) Patent No.: US 8,932,670 B2
(45) Date of Patent: Jan. 13, 2015

(54) GLASS ARTICLE WITH AN ANTI-SMUDGE SURFACE AND A METHOD OF MAKING THE SAME

(75) Inventors: John William Botelho, Corning, NY (US); Jeffrey John Domey, Elmira, NY (US); Linda Frances Reynolds-Heffer, Horseheads, NY (US); Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 653 days.

(21) Appl. No.: 12/955,167

(22) Filed: Nov. 29, 2010

(65) Prior Publication Data

US 2011/0129665 A1 Jun. 2, 2011

Related U.S. Application Data

(60) Provisional application No. 61/264,934, filed on Nov. 30, 2009.

(51) Int. Cl.
| | | |
|---|---|---|
| *B05D 5/06* | (2006.01) | |
| *C03C 17/30* | (2006.01) | |
| *G02B 27/00* | (2006.01) | |

(52) U.S. Cl.
CPC ............ *C03C 17/30* (2013.01); *G02B 27/0006* (2013.01); *C03C 2218/112* (2013.01)
USPC ........... 427/168; 427/110; 427/165; 427/427; 427/427.2; 427/427.4; 106/287.1; 106/287.27

(58) Field of Classification Search
None
See application file for complete search history.

(56) References Cited

U.S. PATENT DOCUMENTS

| | | | | |
|---|---|---|---|---|
| 4,390,127 A | * | 6/1983 | Behrend | 239/83 |
| 4,983,459 A | | 1/1991 | Franz et al. | |
| 5,328,768 A | | 7/1994 | Goodwin | |
| 5,976,612 A | * | 11/1999 | Tardoni | 427/8 |
| 6,337,133 B1 | | 1/2002 | Akamatsu et al. | |
| 2002/0192380 A1 | * | 12/2002 | Elsbernd et al. | 427/314 |
| 2007/0243394 A1 | * | 10/2007 | Yamaya et al. | 428/447 |
| 2009/0197048 A1 | * | 8/2009 | Amin et al. | 428/142 |

FOREIGN PATENT DOCUMENTS

| | | |
|---|---|---|
| JP | 50097616 | 2/1975 |
| WO | 2010/038648 | 4/2010 |

OTHER PUBLICATIONS

International Search Report and Written Opinion of the International Searching Authority; Aug. 19, 2011; Application No. PCT/US2010/058164.
Block et al; "New Anti-Fingerprint Coatings"; Dow Corning; 6 Pages.

* cited by examiner

*Primary Examiner* — Timothy Meeks
*Assistant Examiner* — Michael P Rodriguez
(74) *Attorney, Agent, or Firm* — Timothy M. Schaeberle; Payal A. Patel

(57) ABSTRACT

A method of making a glass article with an anti-smudge surface includes providing a glass article with a target surface. The method includes providing a coating solution consisting essentially of a fluorosilane compound and a solvent that is miscible with the fluorosilane compound. The method includes spray-coating the target surface with the coating solution while controlling the spray-coating to form a coating layer having a thickness in a range from 1 to 20 nm on the target surface.

8 Claims, 5 Drawing Sheets

GLASS ARTICLE WITH AN ANTI-SMUDGE SURFACE AND A METHOD OF MAKING THE SAME

CROSS-REFERENCE TO RELATED APPLICATIONS

This application claims benefit of U.S. Provisional Application No. 61/264,934, filed 30 Nov. 2009.

TECHNICAL FIELD

The present invention relates in general to methods of treating surfaces of glass articles. More particularly, the present invention relates to a method of applying an anti-smudge coating on a glass surface.

BACKGROUND

Manufacturers of consumer electronic devices such as mobile phones and laptops are turning to glass as the material of choice for device covers. These device covers are regularly smudged with fingerprints and other materials due to normal use. Therefore, it is desirable to make the covers easy to clean. One approach to making covers that are easy to clean is to coat the surface of the glass used in making the covers with a fluorosilane compound. The fluorosilane compound could reduce the surface energy of the glass, which would result in an increase in the contact angle of many materials, such as water and oil, on the glass. This increase in contact angle means that the treated glass surface will be easy to clean.

Examples of a fluorosilane compound suitable for use as an anti-smudge coating are Dow Corning® 2604 and 2634 coatings (alkoxysilyl perfluoropolyether adducts). Normally, HFE7200 solvent (ethyl nonafluorobutylether), which has a boiling point of about 76° C., is mixed with the coating material to form a coating solution. Dow Corning Corporation recommends applying these coatings on bare glass with a standard dip process or a chemical vapor deposition process. With the proper application of the coating on the glass surface, large static contact angle (>100° for deionized water, >70° C. for oleic oil) and low sliding angles can be achieved. Also, the performance of the coating will not degrade even after 10,000 wipes on the surface (Block, Steven et al., New Anti-Fingerprint Coatings Whitepaper, Dow Corning Corporation, 2008). The easy-to-clean surface coating does not need to be excessively thick; only a monolayer of the material (about 2 nm) is needed on the glass surface to provide the desired performance. On the other hand, a thicker multilayer of the coating material does not increase the cleaning performance and may leave an undesirable visible stain.

The standard dip coating process is widely used in coating a surface. The process can be easily implemented and does not require complex process equipment. Also, the process can be designed to coat a large number of samples at one time, which has a positive impact on throughput. However, the dip coating process has several drawbacks. During the dip coating process, a large amount of coating solution is exposed to the ambient environment, resulting in significant loss of the coating material due to evaporation. This lowers effective use of the coating material and increases the cost of the coated glass. As each dip coating is performed, the solution in the dip coating bath is susceptible to contamination, which may lead to contamination of the coated glass. The dip coating process results in a thicker-than-required (possibly non-uniform) coating layer, with excess coating material on the glass. This leads to visible stains on the glass surface that must be removed. Typically, these coating stains are removed by rinsing the stained glass in a bath containing the original (or another fluorocarbon) solvent. This rinse bath is also typically exposed to the environment, leading to evaporation of solvent, increase in material cost, and release of volatile fluorocarbon to the atmosphere. In addition, since the dip coating process involves submerging the glass in a bath, the dip coating process typically coats all sides of the glass, whereas only one side requires the easy-to-clean coating. Thus, the coating on the other side of the glass needs to be removed. This typically requires use of plasma or UV ozone. This extra coating leads to more process steps (i.e., to remove the material from undesired sides/areas of the glass) and a higher product cost (i.e., more coating material is used than is needed).

SUMMARY

In a first aspect of the present invention, a method of making a glass article with an anti-smudge surface comprises (a) providing a glass article with a target surface, (b) providing a coating solution consisting essentially of a fluorosilane compound and a solvent that is miscible with the fluorosilane compound, and (c) spray-coating the target surface with the coating solution while controlling the spray-coating to form a coating layer having a thickness in a range from 1 to 20 nm on the target surface.

In one embodiment of the first aspect of the present invention, the target surface of the glass article provided in step (a) is bare or is coated with anti-reflection material.

In one embodiment of the first aspect of the present invention, the coating layer on the target surface is a monolayer of the fluorosilane compound.

In one embodiment of the first aspect of the present invention, the coating layer on the target surface exhibits a contact angle with deionized water greater than 100° and a contact angle with oleic acid greater than 70°.

In one embodiment of the first aspect of the present invention, each of the aforementioned contact angles do not change by more than 5% after 10,000 wipes.

In one embodiment of the first aspect of the present invention, the contact angle with deionized water is greater than 100° and the contact angle with oleic acid is greater than 70° after 10,000 wipes.

In one embodiment of the first aspect of the present invention, step (c) comprises atomizing the coating solution while spraying the coating solution.

In one embodiment of the first aspect of the present invention, in step (c), atomizing is by injecting gas at a pressure in a range from 10 psi to 70 psi into the coating solution.

In one embodiment of the first aspect of the present invention, in step (c), the coating solution is sprayed at a flow rate of 0.861 to 8.61 µl/cm².

In one embodiment of the first aspect of the present invention, in step (c), a liquid pressure of the spray coating solution is in a range from 0.5 psi to 5 psi.

In one embodiment of the first aspect of the present invention, step (c) comprises using a nozzle to spray the coating solution, wherein a distance from an exit of the nozzle to the target surface is in a range from 0.5 inches to 8 inches.

In one embodiment of the first aspect of the present invention, step (c) comprises using a nozzle to spray the coating solution, wherein a pass width of the nozzle is in a range of 0.5 inches to 3 inches.

In one embodiment of the first aspect of the present invention, in step (b), the solvent that is miscible with the fluorosilane compound is a fluorocarbon solvent.

In one embodiment of the first aspect of the present invention, in step (b), the fluorosilane compound is an alkoxysilyl perfluoropolyether adduct and the aforementioned fluorocarbon solvent is a nonafluorobutylether solvent.

In a second aspect of the present invention, the present invention relates to a glass article having an anti-smudge surface. The glass article comprises an anti-smudge coating layer spray-coated on a target surface of the glass article. The anti-smudge coating layer consists essentially of a fluorosilane compound and has a thickness of 1 to 20 nm. The anti-smudge coating layer exhibits a contact angle with deionized water greater than 100° and a contact angle with oleic acid greater than 70°. Each of the contact angle with the deionized water and the contact angle with the oleic acid does not change by more than 5% after 10,000 wipes.

In one embodiment of the second aspect of the present invention, the fluorosilane compound is an alkoxysilyl perfluoropolyether adduct.

These and other aspects and advantages of the present invention will be apparent from the following description and the appended claims.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
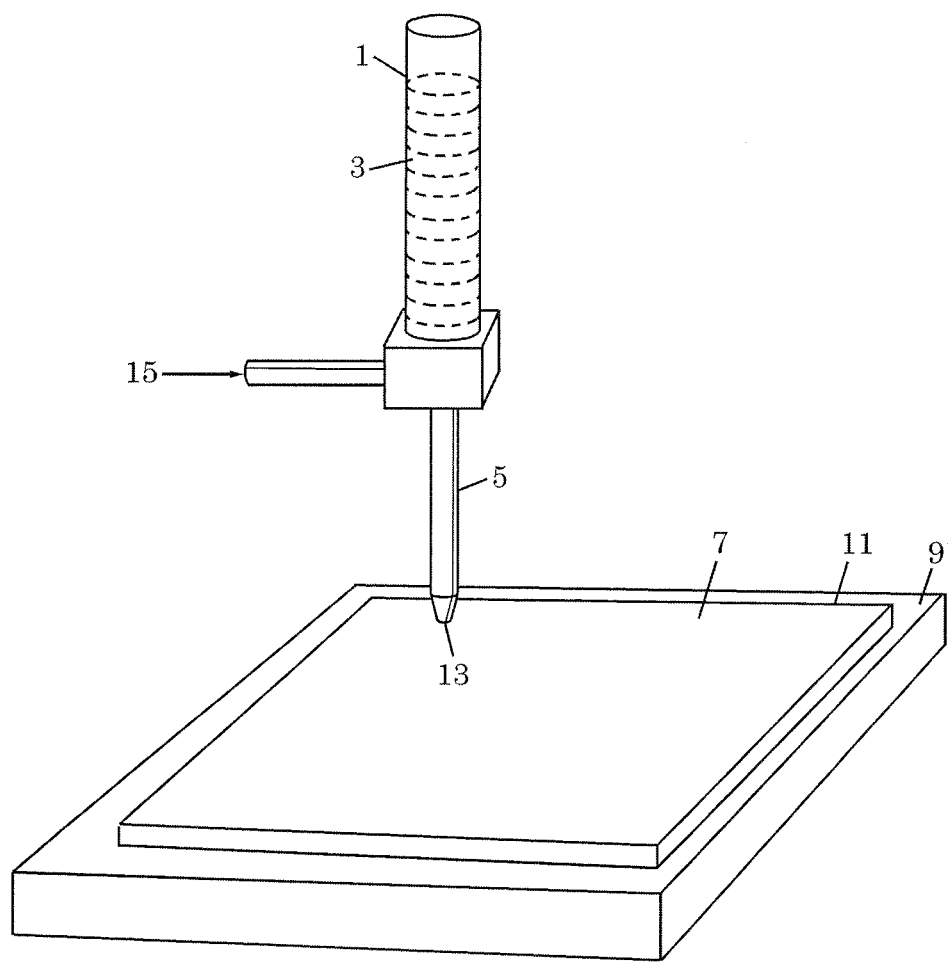
FIG. 1 is a schematic of a method of spray-coating a glass surface.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

In certain aspects of the present invention, a method of making a glass article with an anti-smudge surface includes providing a glass article with a target surface. The target surface is the surface of the glass article to be transformed into an anti-smudge surface by the method of the present invention. In one embodiment, the target surface is uncoated or is bare. In another embodiment, the target surface is coated with an anti-reflection material or is anti-reflective. The glass article may be two-dimensional or three-dimensional in shape. The glass article may be made using any suitable process and glass material (glass, glass-ceramic, or glass laminate). As an example, the glass article may be made from a glass sheet using a glass reforming process. Thermal glass reforming involves heating the glass sheet and then molding or pressing the glass sheet into a three-dimensional shape. The glass sheet used for the glass reforming may be made using any suitable process, such as fusion process or float process. In certain embodiments of the present invention, the glass article with the target surface has been chemically-strengthened by ion-exchange.

In certain aspects of the present invention, the method of making a glass article with an anti-smudge surface further includes applying an anti-smudge coating material on the target surface of the glass article using a spray coating process. In certain embodiments of the present invention, the anti-smudge coating material is a fluorosilane compound. Examples of a fluorosilane compound usable in the present invention include, but are not limited to, DOW CORNING® 2604 coating and DOW CORNING® 2634 coating (alkoxysilyl perfluoropolyether adducts). To apply the fluorosilane compound on the target surface of the glass article, a spray coating solution of the fluorosilane compound is prepared. The spray solution consists essentially of the fluorosilane compound and a solvent that is miscible with the fluorosilane compound. In one embodiment, the solvent is a fluorocarbon solvent. In other embodiments, other fluorinated or non-fluorinated solvents that are miscible with the fluorosilane compound may be used. In certain embodiments, the spray solution contains 0.1 wt % DOW CORNING® 2604 coating or DOW CORNING® 2634 (alkoxysilyl perfluoropolyether adduct) coating in HFE7200 (nonafluorobutylether) solvent.

The spray coating process involves pumping the spray coating solution into a nozzle. At the same time, atomizing gas (e.g., air, nitrogen, or an inert gas) is injected under pressure into the nozzle to form a mist of droplets from the spray coating solution. The mist of droplets is deposited on the target surface of the glass article, thereby coating the target surface of the glass article with the spray coating solution. There are commercial machines available for spray-coating a substrate with a solution. One suitable example is SELECT COAT® SL-940E conformal coating system with SC-300 SWIRL COAT™ applicator from Asymtek. FIG. 1 shows a reservoir 1 holding a spray coating solution 3 as described above. The volume of the reservoir 1 can be suitably selected. It should be noted that several details of the spray coating machine are not shown in FIG. 1 since the present invention is not about the machine. A nozzle 5 is provided at the end of the reservoir 1 for spraying the spray coating solution 3 on the glass surface 7. The reservoir 1 (e.g., a syringe or larger container) keeps the spray coating solution 3 from being exposed to the ambient environment during spray coating. As a result, solvent evaporation from the spray coating solution 3 and contamination of the spray coating solution 3 from the surrounding environment is avoided. The entire spray coating process may take place in an enclosed chamber.

A vacuum chuck (not shown) may be used to hold the glass article 11 to be treated with the spray coating solution 3. In the case of the SELECT COAT® SL-940E conformal coating system, the vacuum chuck can be held by the rails of the conveyor system in the coating cell. Alternatively, the glass article 11 can be placed directly on a table 9 beneath the spray nozzle 5. A conveyor belt can also be used for a continuous spray process. During the spray coating process, the spray coating solution 3 is delivered to the nozzle 5. At the same time, atomization gas 15, e.g., air, is fed under pressure into the nozzle 5 to atomize the spray coating solution 3 delivered to the nozzle 5. The nozzle 5 moves across the glass surface 7 in passes, while spraying the atomized spray solution on the glass surface 7. The nozzle 5 moves back and forth until the glass surface 7 is covered with the spray coating solution 3. Alternatively, the nozzle 5 is stationary, but the glass surface 7 is moving during the coating process. The nozzle tip 13 can start at one corner of the glass surface 7 of the glass article 11 and end at the diagonal corner of the glass surface 7 of the glass article 11. To ensure the full coverage of the glass surface 7, the nozzle 5 can start slightly outside the first corner and stop slightly outside the diagonal corner.

There are a few important parameters of the spray coating process to ensure a uniform and thin coating: pressure of gas to atomize the spray coating solution, liquid pressure of the spray coating solution, flow rate of the spray coating solution (controlled by a micrometer), the distance between the nozzle tip and the glass surface (nozzle height), the size of the nozzle orifice at the nozzle tip (which determines pass width), and the speed of the nozzle during spraying. One example of set-up points is: 30 psi gas pressure, 1 psi liquid pressure, 1" nozzle height, 0.007" micrometer, and 0.7" pass width. In general, the gas pressure may range from 10 psi to 70 psi. The pass width may range from 0.5 inches to 1 inch. The nozzle height may range from 0.5 inches to 8 inches. The flow rate of the spray coating solution, as controlled by the micrometer, may range from 0.861 to 8.61 $\mu l/cm^2$, preferably from 0.861 to 1.29 $\mu l/cm^2$.

Figure 2:
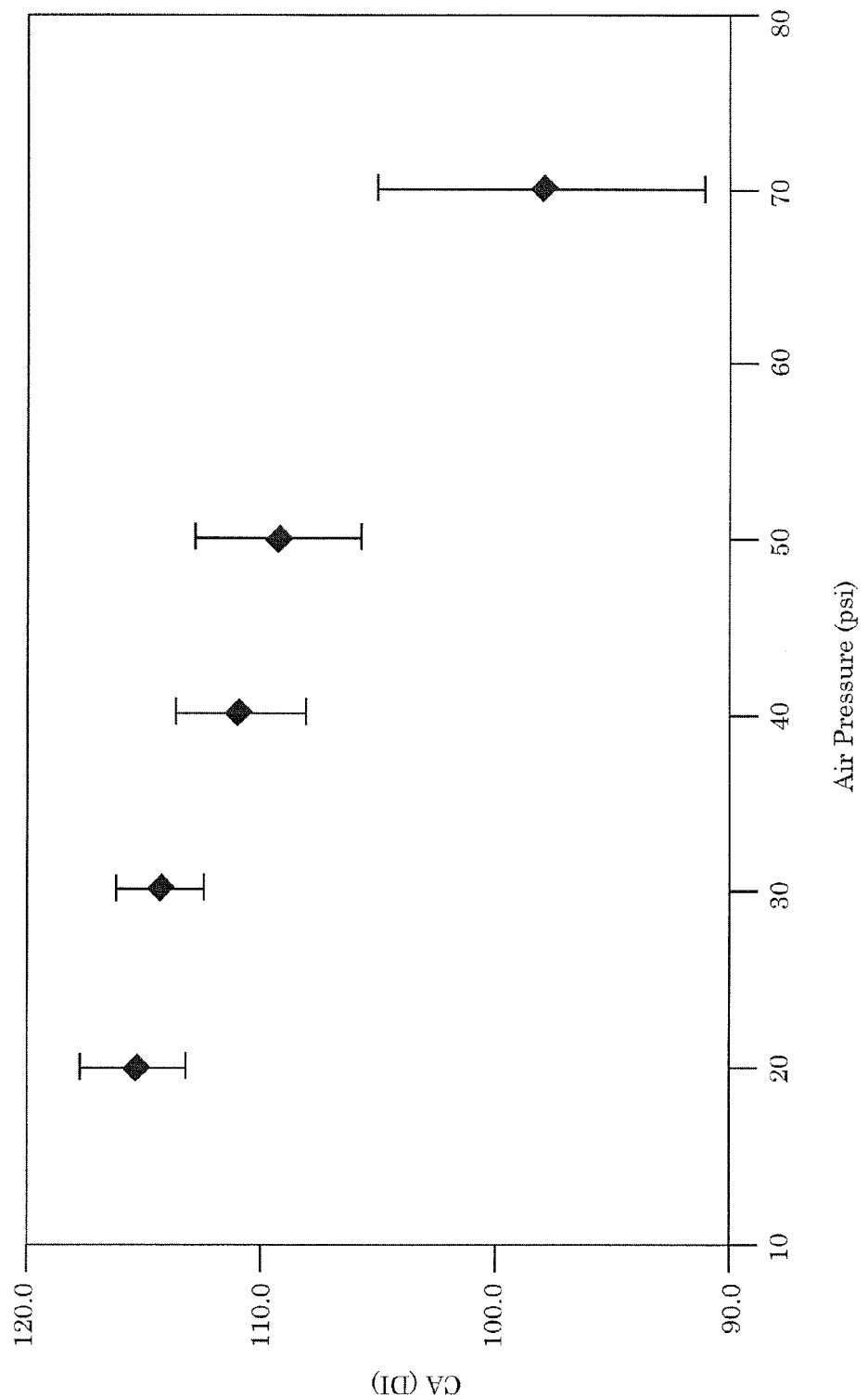
FIG. 2 shows a relationship between air pressure and contact angle for deionized water.

FIG. 2 shows a relationship between air pressure (which is used for atomization) and resulting contact angle for deionized (DI) water. FIG. 2 shows that air pressure in a range from 20 psi to 40 psi results in a contact angle greater than 100°. Typically, higher air pressure is preferred for better atomization of a spray solution during spray coating. However, this is not the case for the spray coating solution used in the study of FIG. 2 (i.e., 0.1 wt % Dow Corning® 2604 coating or Dow Corning® 2634 coating in HFE7200 solvent). There are two possible reasons for this behavior. One reason is that with higher air pressure (e.g., >40 psi), the size of liquid drops are smaller and can be carried away easily by the exhaust before reaching the glass surface. Therefore, to use a higher air pressure, a higher flow rate would have to be used to meet the contact angle requirement, which would increase cost. The other reason is that with higher pressure (e.g., >40 psi), most of the solvent will evaporate during the path between the nozzle and glass surface (the boiling point of the fluorocarbon solvent is quite low at 76° C.). When the droplets of coating material reach the surface, there will not be much solvent left to help coalesce the droplets, which would make it more difficult to form a continuous coating film.

With a lower air pressure (e.g., 10 psi), visible droplets (stains) can be seen on the glass surface, due to insufficient atomization of the coating liquid. Both liquid pressure and micrometer control the fluid flow rate. It is preferred that the micrometer set point is in the range of 0.004" to 0.008" since the error may be large for a set point lower than 0.004" and flow rate will be too high for a set point higher than 0.008". The flow rate, as controlled by the micrometer, is preferably from 0.861 to 1.29 $\mu l/cm^2$. The liquid pressure is preferably in a range of 0.5 psi to 5 psi. Similar to the micrometer, the error will be large for a set point lower than 0.5 psi, whereas a set point higher than 5 psi may spray more material than necessary. Nozzle height is preferably in a range of 0.5" to 2". Pass width is preferably in a range of 0.5" to 1" to maximize the coverage of each pass. Controlling the spray coating process using the parameter settings described above should yield a uniform and thin coating layer of the fluorosilane compound on the glass surface 7. In one embodiment, the thin coating layer has a thickness in a range from 1 to 20 nm. In another embodiment, the thin coating layer has a thickness in a range from 1 to 10 nm. In yet another embodiment, the thin coating layer has a thickness in a range from 1 to 5 nm.

Figure 3A:
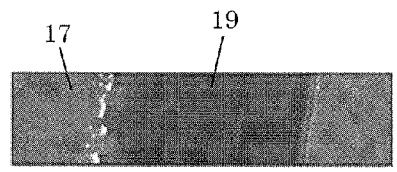
FIG. 3A shows an atomic force microscopy image of a coating applied on a glass surface by spray coating.
Figure 3B:
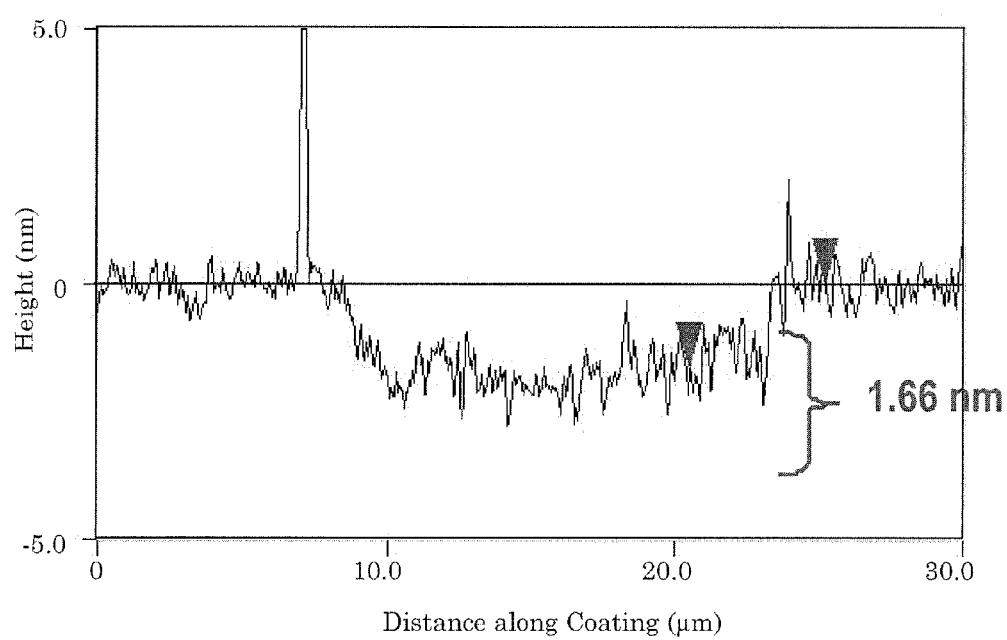
FIG. 3B shows a thickness analysis of the coating of FIG. 3A.

FIG. 3A shows an atomic force microscopy (AFM) image of a coating 17 formed on a glass surface by the spray coating process described above. FIG. 3B shows an analysis of the thickness of the coating of FIG. 3A. To analyze the thickness of the coating, the coating was scratched down to the glass at the darker area identified as 19 in FIG. 3A. FIG. 3B shows the height profile along the length (horizontal direction) of the coating (of FIG. 3A). X-axis is the distance along the coated glass. The lower height part is the scratched area (17 in FIG. 3A). Y-axis is the height along the coated glass. 0 is the coating surface, and −1.66 nm is the glass surface since it is lower than the coating surface. FIG. 3B shows that the coating laid down by the spray coating is a monolayer. Therefore, there would be no need to rinse the coated glass to remove excess coating material, as in the case of dip coating. In the coating of FIG. 3A, the spray coating solution is 0.1 wt % Dow Corning® 2604 coating or Dow Corning® 2634 coating in HFE7200 solvent.

The performance of the coating with spray coating is the same as that of dip-coated glass. Table 1 shows the contact angle of spray-coated samples with deionized (DI) water and oleic oil after zero and 10,000 wipes. The liquid drop size is 10 $\mu L$ (unless mentioned otherwise, the drop size will be 10 $\mu L$ in this disclosure). The contact angle of deionized water on the coating layer is higher than 100°. The contact angle of oleic acid on the coating layer is greater than 70°. There is no degradation in contact angle on the coating layer after 10,000 wipes. No degradation after 10,000 wipes means that the contact angle after 10,000 wipes does not change by more than 5% from the contact angle before the 10,000 wipes. As shown in Table 1, the contact angles are still above 100° for deionized water and above 70° for oleic acid after 10,000 wipes. The testing was conducted with a crock meter. Wiping conditions were with a force of 9N over a 16-mm diameter contact area using a woven fiber cloth, which shows that the coating is quite durable. In Table 1 and subsequent tables, the spray coating solution is 0.1 wt % DOW CORNING® 2604 coating or DOW CORNING® 2634 coating in HFE7200 solvent.

TABLE 1

| Sample ID | Deionized Water | | Oleic acid | |
| --- | --- | --- | --- | --- |
| | Initial | 10,000 wipes | Initial | 10,000 wipes |
| 1 | 113.9 + 1.6 | 113.2 + 1.5 | 76.4 + 0.6 | 75.6 + 0.7 |
| 2 | 114.1 + 1.2 | 111.6 + 1.7 | 76.0 + 0.4 | 75.6 + 1.5 |
| 3 | 114.8 + 1.3 | 112.5 + 0.7 | 77.1 + 1.1 | 76.1 + 1.8 |

Figure 4:
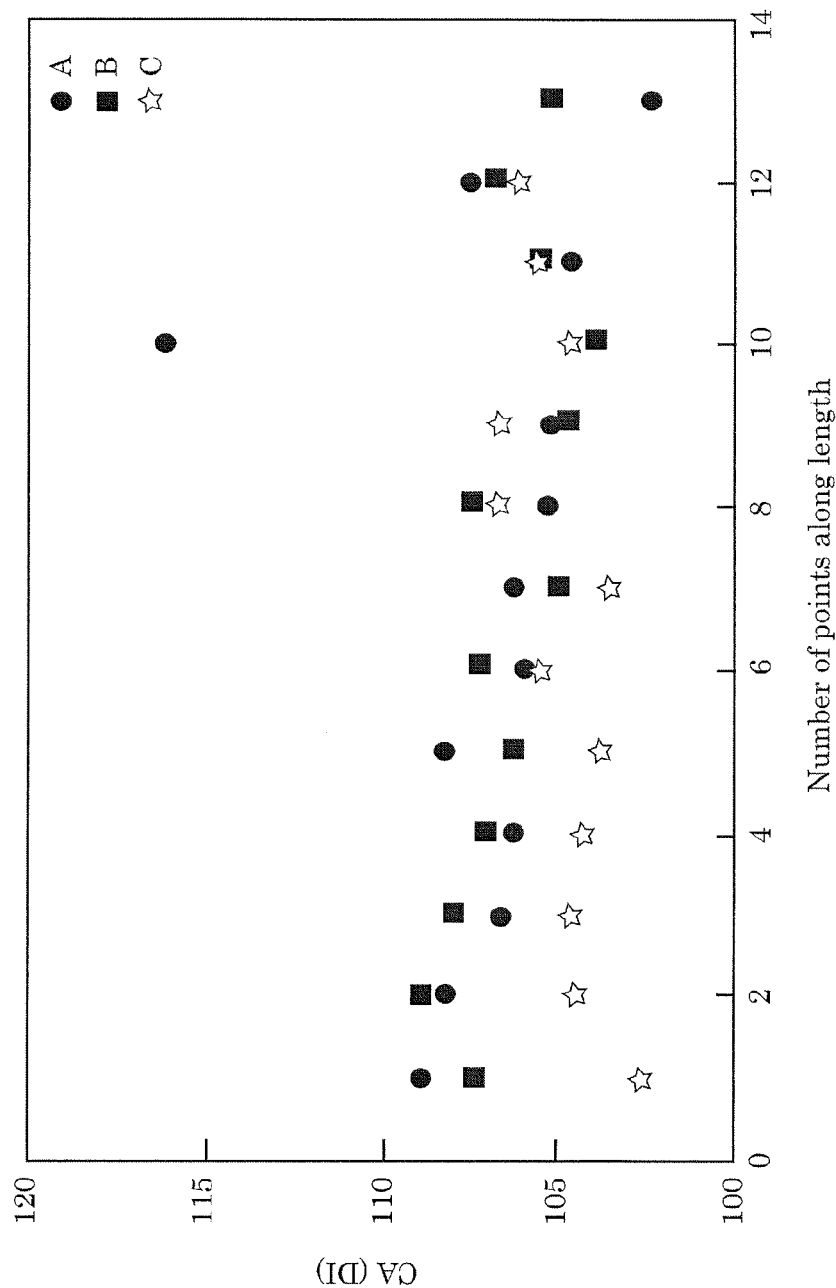
FIG. 4 is a plot showing contact angle along the length of a sample with 2 μL drop size of deionized water for a glass surface spray-coated with a fluorosilane compound.
Figure 5:
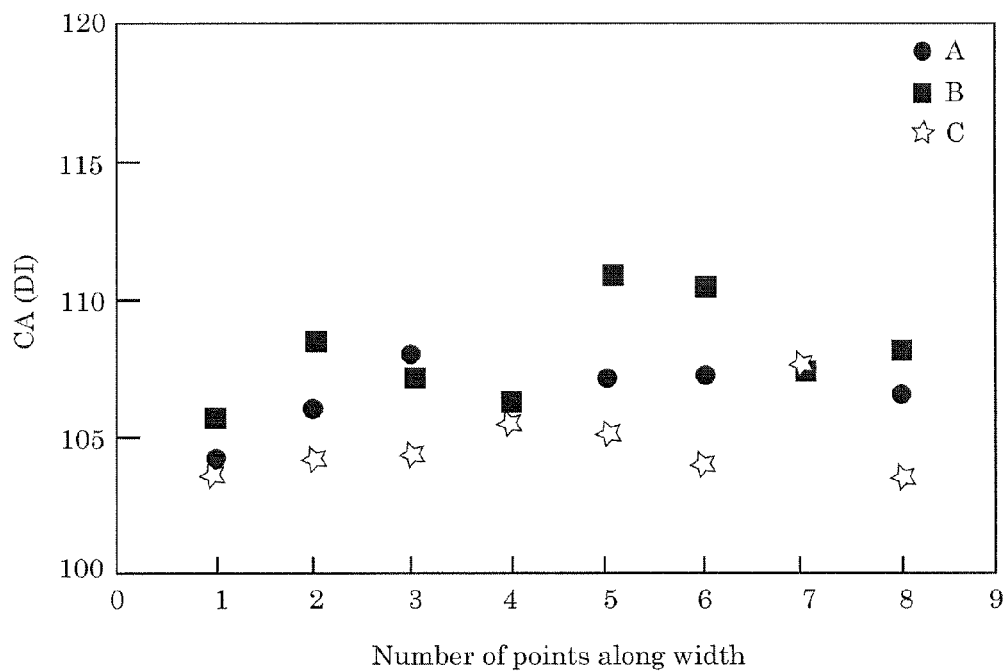
FIG. 5 is a plot showing contact angle along the width of a sample with 2 μL drop size of deionized water for a glass surface spray-coated with a fluorosilane compound.
Figure 6:
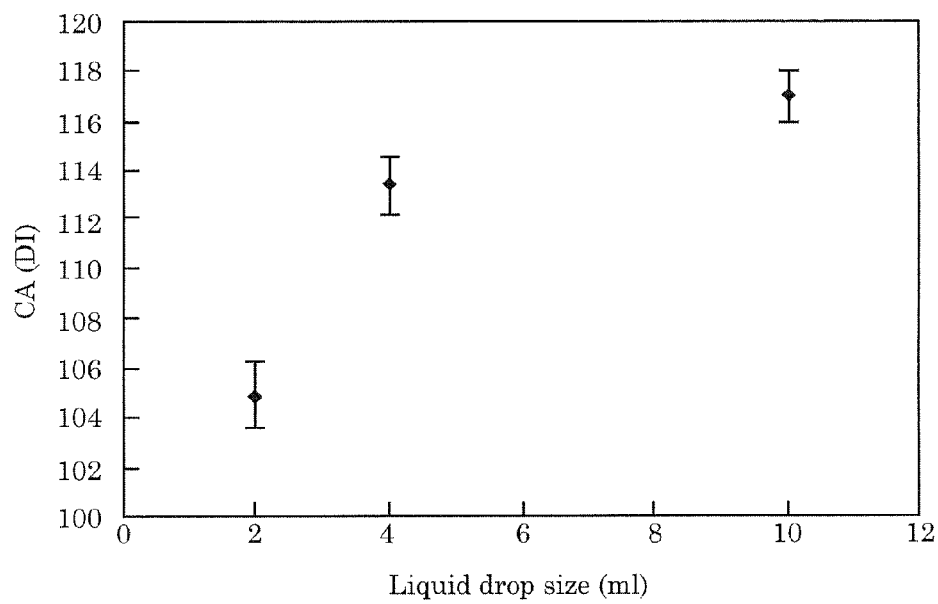
FIG. 6 shows a relationship between contact angle and liquid drop size for deionized water on a glass surface spray-coated with a fluorosilane compound.

FIG. 4 and FIG. 5 show the contact angle along the length (3 inches in total) and width (2 inches in total), respectively, of samples A, B, and C with 2 $\mu L$ drop size of deionized water for a glass surface spray coated with a fluorosilane compound. FIG. 6 shows the relationship between contact angle for deionized (DI) water and liquid drop size for a glass surface spray coated with a fluorosilane compound. As shown in FIG. 6, the contact angle with 2 $\mu L$ is about 10° lower than with 10 $\mu L$ drop size. Even with such a difference in drop size, the contact angles along the length and width are all above 100° and quite uniform. This indicates that the coating is uniform across the surface. In FIGS. 4-6, the spray coating used is 0.1 wt % DOW CORNING® 2604 coating or DOW CORNING® 2634 coating in HFE7200 solvent.

Table 2 shows the haze and gloss values of spray-coated samples. The values are the same as bare glass, which indicates that the coat is not visible and has no impact on optical performance.

TABLE 2

| Sample ID | Haze | Gloss (at 60°) |
|---|---|---|
| 4 | 0.06/0.05/0.07 | 154 |
| 5 | 0.06/0.05/0.06 | 154 |
| 6 | 0.06/0.05/0.06 | 154 |

Table 3 lists the contact angle of spray samples after various environmental testing. The results show that the coating is durable.

TABLE 3

| | CA (DI water) | | Oleic acid | |
|---|---|---|---|---|
| Condition | Average | Standard Deviation | Average | Standard Deviation |
| control | 116.6 | 0.8 | 78.6 | 0.7 |
| 500 hrs at 85° C., 85% RH | 115.4 | 1.4 | 78.5 | 0.4 |
| 500 hours at 60° C., 93% RH | 117.3 | 0.8 | 78.8 | 0.5 |
| 500 hours at 80° C. | 105.1 | 3.4 | 78.4 | 0.5 |
| 100 cycles from −40° C. to 85° C. | 117.1 | 1.1 | 78.5 | 0.5 |
| 45 cycles from 25° C. to 55° C., in 95% RH | 117.6 | 0.6 | 79.1 | 0.5 |
| 500 hours at −40° C. | 117.4 | 0.8 | 80.1 | 0.8 |

Table 4 shows the contact angle after 24 hours of contact between the coated surface and a chemical. The results show that the contact angle (DI water) is still above 100° after this testing, which further indicates that the coating is durable.

TABLE 4

| | | CA (DI water) | |
|---|---|---|---|
| | Haze | Average | Standard Deviation |
| Acetone | 0.08 | 116.9 | 0.9 |
| Butter | 0.07 | 116.8 | 0.6 |
| Canola Oil | 0.07 | 116.8 | 1.0 |
| Citrus Cleaner | 0.08 | 115.5 | 2.6 |
| Dish Soap | 0.07 | 113.3 | 2.2 |
| Ethanol | 0.06 | 117.5 | 0.9 |
| Ketchup | 0.06 | 115.6 | 0.9 |
| Lipstick | 0.06 | 114.5 | 1.2 |
| Lotion | 0.06 | 117.9 | 0.4 |
| Make-up Foundation | 0.07 | 114.7 | 2.0 |
| Mayonnaise | 0.07 | 114.9 | 1.9 |
| Mustard | 0.07 | 113.9 | 3.1 |
| Olive Oil | 0.06 | 116.5 | 1.2 |
| Orange Peel | 0.08 | 115.1 | 2.2 |
| Sunscreen | 0.07 | 118.0 | 0.8 |
| Windex | 0.07 | 107.4 | 1.6 |

Spray coating the fluorosilane compound on the target glass surface as described above provides several advantages compared to dip coating. One advantage is that manufacturing costs are reduced. Since material is dispensed near the theoretical minimum required to form a monolayer of material on the glass surface, material use is reduced. Material is stored in a closed reservoir during the spray coating process. As a result material loss due to evaporation is reduced. The resulting coating layer, being of monolayer thickness (1 to 20 nm), eliminates the need to rinse off excess coating material. Another advantage is process simplification. Rinsing of the coated glass is eliminated as previously mentioned. Also, single-coated coating eliminates the need to remove the coating from unwanted surfaces. Another advantage is product size flexibility. The spray coating process can easily accommodate various glass sizes. Larger surface areas will follow the same general process as smaller areas, except that larger products will require a larger spray area. Spray coating can coat not only a flat glass surface, but also a glass surface with curvature. Another advantage is durability. As shown above, the coating layer formed by the spray coating process described above exhibits a contact angle that does not degrade after 10,000 wipes and under various temperature and relative humidity conditions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making a glass article with an anti-smudge surface, comprising:
   (a) providing the glass article with a target surface;
   (b) providing a coating solution consisting essentially of a fluorosilane compound and a solvent that is miscible with the fluorosilane compound; and
   (c) atomizing the coating solution and spray-coating the target surface of the glass article with the atomized coating solution while controlling the spray-coating to form a coating layer consisting of a monolayer of a fluorosilane compound having a thickness in a range from 1 to 20 nm on the target surface;
   wherein the coating solution is atomized by injecting gas at a pressure in a range from 10 psi to 70 psi into the coating solution, the coating solution is sprayed using at least one of
   a micrometer set point in the range from 0.004 inches to 0.008 inches,
   a liquid pressure in a range from 0.5 psi to 5 psi,
   a nozzle and a nozzle exit distance to the target surface is in a range from 0.5 inches to 8 inches, and
   a nozzle pass width in a range from 0.5 inches to 3 inches.

2. The method of claim 1, wherein the target surface of the glass article provided in step (a) is bare or is coated with an anti-reflection material.

3. The method of claim 1, wherein the coating layer on the target surface exhibits a contact angle with deionized water greater than 100° and a contact angle with oleic acid greater than 70°.

4. The method of claim 3, wherein each of the contact angle with deionized water and the contact angle with oleic acid does not change by more than 5% after 10,000 wipes with a woven fiber cloth and a force of 9N over a 16-mm diameter contact area.

5. The method of claim 3, wherein the contact angle with deionized water is greater than 100° and the contact angle with oleic acid is greater than 70° after 10,000 wipes with a woven fiber cloth and a force of 9N over a 16-mm diameter contact area.

6. The method of claim 1, wherein in step (c), the coating solution is sprayed at a flow rate of 0.861 to 8.61 μl/cm².

7. The method of claim 1, wherein in step (b), the solvent that is miscible with the fluorosilane compound is a fluorocarbon solvent.

8. The method of claim 7, wherein in step (b), the fluorosilane compound is an alkoxysilyl perfluoropolyether adduct and the fluorocarbon solvent is a nonafluorobutylether solvent.

\* \* \* \* \*